US007466528B2

(12) United States Patent
Lafon

(10) Patent No.: US 7,466,528 B2
(45) Date of Patent: Dec. 16, 2008

(54) OVERLOAD AND SHORT-CIRCUIT PROTECTION DEVICE WITH A BREAKER RIBBON

(75) Inventor: Guy Lafon, Bagneres de Bigorre (FR)

(73) Assignee: ABB France, Rueil-Malmaison Cedex (FR)

( * ) Notice: Subject to any disclaimer, the term of this patent is extended or adjusted under 35 U.S.C. 154(b) by 0 days.

(21) Appl. No.: 11/572,474

(22) PCT Filed: Jul. 21, 2005

(86) PCT No.: PCT/FR2005/001890

§ 371 (c)(1), (2), (4) Date: Dec. 21, 2007

(87) PCT Pub. No.: WO2006/018515

PCT Pub. Date: Feb. 23, 2006

(65) Prior Publication Data

US 2008/0192400 A1 Aug. 14, 2008

(30) Foreign Application Priority Data

Jul. 21, 2004 (FR) .................................. 04 08095

(51) Int. Cl.
*H02H 3/00* (2006.01)

(52) U.S. Cl. .......................................... 361/117; 361/2

(58) Field of Classification Search ..................... 361/2, 361/12, 40, 117; 208/149, 151
See application file for complete search history.

(56) References Cited

U.S. PATENT DOCUMENTS

| | | | | |
|---|---|---|---|---|
| 2,468,422 | A | 4/1949 | Wood | |
| 2,707,218 | A * | 4/1955 | Cellerini | 218/151 |
| 6,248,970 | B1 * | 6/2001 | DiMarco et al. | 218/149 |
| 7,186,941 | B2 * | 3/2007 | Yeon | 218/38 |

FOREIGN PATENT DOCUMENTS

| | | |
|---|---|---|
| EP | 0217106 | 4/1987 |
| EP | 1073078 | 1/2001 |
| EP | 1098331 | 5/2001 |
| GB | 1498826 | 1/1978 |

* cited by examiner

*Primary Examiner*—Danny Nguyen
(74) *Attorney, Agent, or Firm*—Jason A. Bernstein; Powell Goldstein LLP

(57) ABSTRACT

A protective device for an electrical installation, having at least two electrodes between which an electric arc can form, and a device for interrupting (6) the arc, extending between an upstream end (6A) and a downstream end (6B), with an entry region (E) for the arc at the upstream end (6A) thereof, at which point the arc enters the breaker device (6). The breaker device (6) has an insulation means (10) which permit the arc to enter the breaker device (6) while forming an obstacle to reaching the exit for the arc. The insulation means (10) are formed by one or more flexible ribbons which form a partial insulation barrier between the electrodes and the upstream end (6A). The invention further relates to overload and short-circuit protection devices.

9 Claims, 3 Drawing Sheets

OVERLOAD AND SHORT-CIRCUIT PROTECTION DEVICE WITH A BREAKER RIBBON

PRIORITY CLAIM

This patent application is a U.S. National Phase of International Application No. PCT/FR2005/001890, filed Jul. 21, 2005, which claims priority to French Patent Application No. 0408095,filed Jul. 21, 2004, the disclosures of which are incorporated herein by reference in their entirety.

FIELD OF THE INVENTION

The present invention relates to devices for protecting electrical equipment and installations against overvoltages, notably transient overvoltages due to lightning, overloads or short circuits.

The present invention more particularly relates to a device for protecting an electric installation against overvoltages, overload and short-circuits, including at least two main electrodes between which an electric arc is able to form, as well as a device for breaking the electric arc extending, considering the direction of propagation of the electric arc, between an upstream end and a downstream end and having, at its upstream end, an entry area for the arc, at which the electric arc penetrates inside the breaker device, the breaker device including, positioned at its upstream end, insulating means against the return of the electric arc, structurally designed and laid out so as to allow the electric arc to enter the breaker device while forming an obstacle against the exit of the electric arc, in order to avoid that the electric arc, once located inside the breaker device, escapes from the breaker device.

BACKGROUND OF THE INVENTION

There are different categories of devices capable of interrupting a current, notably a current of standard frequency (50 Hertz) of strong intensity. Indeed, a distinction is made between devices allowing an electrical installation to be protected against overloads or short-circuits, of the circuit breaker type, and devices allowing an electrical installation to be protected against overvoltages, of the lightning arrester or surge suppressor type.

Such protection devices are generally fitted with a current breaking device (or breaker chamber). In the case of circuit breakers, this breaker device is intended to provide breaking of short-circuit currents. In the case of lightning arresters with spark gaps, the breaker device is intended to provide immediate extinction of the currents.

The breaker device is generally formed by a plurality of splitting plates in metal, mounted in parallel so as to break down the electric arc into small elementary arcs in order to increase the arc voltage and provide breaking of the current. The known breaker devices intrinsically have a predetermined current-breaking power corresponding to the maximum value of the current which they are able to extinguish.

Thus, it is seen that when the intensity values of the current are larger than those recommended for a given breaker device, the electric arc may, after having penetrated into the breaker device, escape from the latter and be formed again outside, for example, by using the shortest path between one of the main electrodes and the end of the splitting plates.

Such a phenomenon is particularly detrimental to the protection device in that it has the effect of interrupting the current breaking attempt. Additionally, this phenomenon may occur several times during a rather short time interval. The electric arc may thus enter into the breaker device, exit therefrom and then again enter therein until the apparatus is destroyed without having managed to interrupt the follow or short-circuit current.

In order to find a remedy to these drawbacks, when larger current-breaking powers are required, it is known to increase the number of splitting plates, to place several protection devices in series or in parallel, or even to resort to complementary mechanisms for physically breaking the electric arc. Nevertheless, all these solutions have a certain number of drawbacks in particular related to their often difficult application, and to the fact that they lead to significant increase in the bulkiness of the protection devices.

SUMMARY OF THE INVENTION

Accordingly, the features provided by the present invention finds a remedy to the different drawbacks listed earlier and proposes a novel device for protecting an electrical installation against overvoltages, overloads or short-circuits, for which the current breaking power is enhanced.

Another feature of the present invention proposes a novel device for protecting an electrical installation against overvoltages, overloads or short-circuits, the bulkiness of which is limited.

Another feature of the present invention proposes a novel device for protecting an electrical installation against overvoltages, overloads or short-circuits, the structure of which is particularly adapted to the case of currents of strong intensity.

Another feature of the present invention proposes a novel device for protecting an electrical installation against overvoltages, overloads or short-circuits, with its manufacturing being particularly simple.

The features provided by the present invention are achieved by means of a device for protecting an electrical installation against overvoltages, overloads or short-circuits, including at least two main electrodes between which an electric arc is able to form, as well as an electric arc breaker device extending, considering the direction of propagation of the electric arc, between an upstream end and a downstream end and having, at its upstream end, an entry area for the arc, at which the electric arc penetrates inside the breaker device, the breaker device including, positioned at its upstream end, insulating means against the return of the electric arc, structurally designed and laid out so as to allow the electric arc to enter the breaker device while forming an obstacle against the exiting of the electric arc, so as to prevent the electric arc, once located inside the breaker device, to escape from the breaker device, wherein the insulating means are formed by one or several flexible strips, in an insulating material, laid out in order to form a partial insulating barrier between the electrodes and the upstream end.

BRIEF DESCRIPTION OF THE DRAWINGS

Other features and advantages of the present invention will become apparent and emerge in more detail upon reading the description, with reference to the drawings, given as purely illustrative and non-limiting, wherein.

DESCRIPTION OF THE INVENTION

The protection device of an electrical installation against overvoltages, overloads or short-circuits according to the present invention, is intended to protect a piece of equipment or an electrical installation. The expression "electrical installation" refers to any type of apparatus or network likely to be subject to voltage perturbations, notably transient overvoltages due to lightning or even to overloads, notably overload or short-circuit currents. Such devices may consist of spark gap lightning arresters or surge suppressors provided with a follow current breaker device or of circuit breakers provided with a short-circuit current breaker device.

In the description, the interest is more particularly focused on a protection device against overvoltages of the spark gap lightning arrester type, but of course the present invention applies to breakers.

Figure 1:
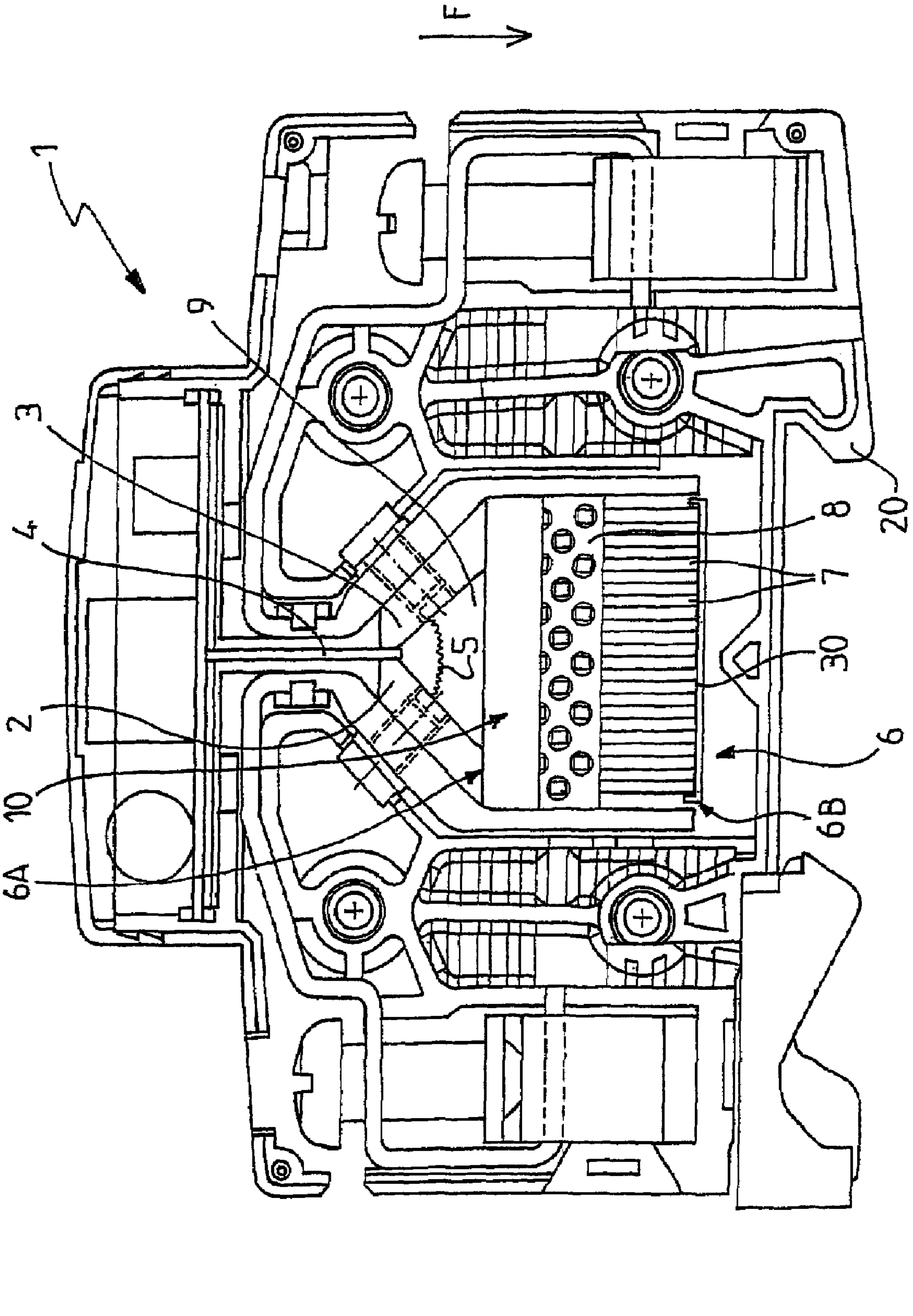
FIG. 1 is a sectional view of an exemplary embodiment of a protection device against overvoltages according to the present invention.

FIG. 1 illustrates a protection device 1 according to the present invention advantageously formed by a spark gap lightning arrester. The protection device 1 comprises, advantageously mounted within an insulating casing 20, at least first and second electrodes 2, 3, which may form, as is illustrated in FIG. 1, two main electrodes of the spark gap lightning arrester. Both of these electrodes 2, 3 are maintained at a distance from each other and separated by a lamella 4 in a dielectric material with which striking an electric arc 5 between the electrodes 2, 3 may be improved and better controlled. This so-called upstream portion of the device is the area for striking the electric arc 5.

In the case of a circuit breaker, the electrodes are formed by two contacts, for example, a fixed contact and a mobile contact maintained in physical contact with each other in order to provide the electrical connection. In this case, the electric arc is formed between both contacts when the mobile contact moves away from the fixed contact to provide the electrical disconnection.

According to the present invention, and as is illustrated in FIG. 1, the protection device 1 includes an electric arc breaker device 6 for breaking the electric arc 5.

In a particularly advantageous way, the breaker device 6 is formed by an assembly of splitting plates 7 in an electrically conducting material, for example, in metal, positioned in parallel and at a distance from each other. The splitting plates 7 are advantageously maintained at a distance from each other by supporting strips 8 in an electrically insulating material.

Figure 3:
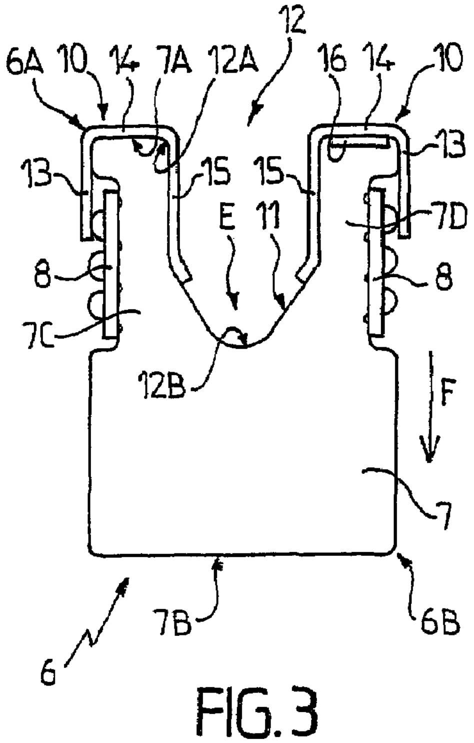
FIG. 3 is a front view of the breaker device of FIG. 2.
Figure 4:
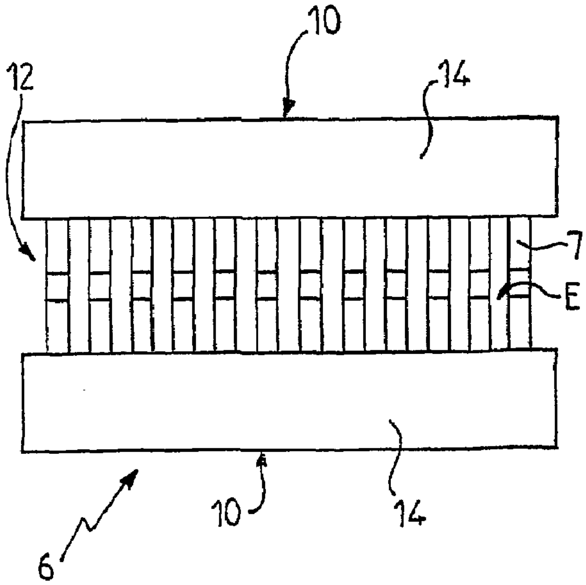
FIG. 4 is a top view of the breaker device of FIG. 2.
Figure 5:
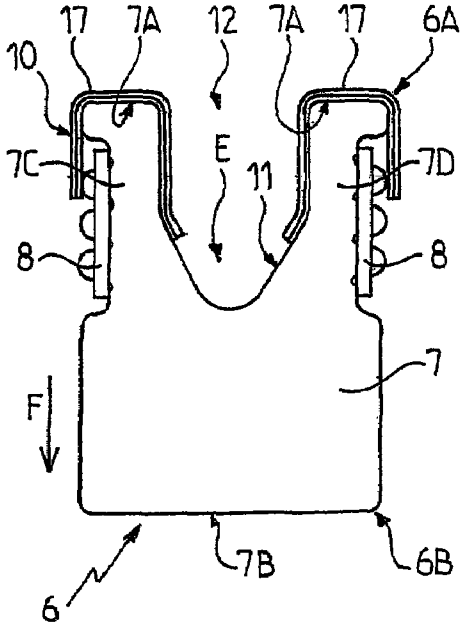
FIG. 5 is a front view of another exemplary embodiment of a breaker device for the protection device according to the present invention.

According to the present invention, the breaker device 6 extends, considering the direction of propagation F of the electric arc 5, between an upstream end 6A and a bottom end 6B. As this is illustrated in FIGS. 3-5, the breaker device 6 at its upstream end 6A, has an entry area E for the electric arc, at which the electric arc 5 penetrates inside the breaker device 6. Thus, before penetrating into the breaker device 6, the electric arc 5 propagates along the direction of propagation F, within a divergent space 9 extending between the electric arc striking area and the breaker device 6. The divergent space 9 is advantageously delimited by the electrodes 2, 3, and preferentially filled with air.

According to an essential feature of the present invention, the breaker device 6 includes, at its upstream end 6A, insulating means 10 against the return of the electric arc 5. These insulating means 10 are structurally designed and laid out so as to allow the electric arc 5 to enter the breaker device 6 while forming an obstacle against the exiting of the electric arc 5 so as to prevent the electric arc, once located inside the breaker device 6, from escaping from the breaker device.

The insulating means 10 are adapted in order to prevent the electric arc 5 from propagating backwards, along a direction opposite to its normal propagation direction F, so that once the electric arc is broken down into a plurality of elementary arcs within the breaker device 6, the electric arc 5 cannot form again outside the breaker device 6, notably in the divergent space 9.

The anti-return insulating means 10, therefore, operate as a hoop net, and the anti-return insulating means 10 are built and positioned relatively to the splitting plates 7 on the one hand, and to the electrodes 2, 3 on the other hand, so as to substantially reduce the likelihood that the electric arc 5 escapes from the breaker device 6. By the design of the protection device 1 according to the present invention, it is, therefore, possible to notably improve its current-breaking power for breaking the short-circuit current.

The insulating means 10 according to the present invention should actually provide an answer to a new problem which is that of letting the electric arc 5 penetrate inside the protection device 6 while limiting the likelihood that the electric arc exits and does not form again outside the breaker device 6.

Advantageously, the insulating means 10 are laid out so as to form a partial insulating barrier between the electrodes 2, 3 and the upstream end 6A of the breaker device 6. The expression "partial insulating barrier" not only refers to physical barriers in an electrically insulating material, but also to not necessarily physical barriers, for example, to electrically insulating barriers, capable of preventing the formation of an electric arc between the electrodes 2, 3 and the upstream end 6A of the breaker device 6.

Advantageously, the splitting plates 7 extend, considering the direction of propagation F of the electric arc 5, between a front end 7A and a distal end 7B. The front ends 7A and the distal end 7B are substantially located on the same level as the upstream 6A and downstream ends 6B of the breaker device 6. In a more particular exemplary embodiment of the present invention, the splitting plates 7 are each provided with a notch 11 at least partly separating each splitting plate 7 into two distinct branches 7C, 7D. Thus, when the splitting plates 7 are assembled so as to form the breaker device 6, the notches 11 form a groove 12, the shape of which, e.g., a V-shape, is specifically designed to attract the electric arc 5 towards the inside of the breaker device 6. In this way, the entry area E for the electric arc 5, substantially coincides with the groove 12.

According a first exemplary embodiment of the present invention, the insulating means 10 are laid out so as to physically, at least partially, close the upstream end 6A of the breaker device 6, thereby forming a physical insulating barrier between the electrodes 2, 3 and the upstream end 6A of the breaker device 6.

In an even more preferred way, the insulating means 10 are laid out so as to cover in totality the upstream end 6A of the breaker device 6 located around, for example, on either side of the entry area E for the electric arc 5. The insulating means 10 may thereby be positioned, as is illustrated in FIG. 3, on either side of the groove 12 so that they will cover the front end 7A of the branches 7C, 7D of the splitting plates 7.

According to another exemplary embodiment of the present invention, the insulating means 10 may be formed by one or several rigid strips (not shown) for example, positioned on either side of the groove 12 so as to cover the front end 7A of the splitting plates 7. The rigid strips then preferably extend along a plane substantially perpendicular to the direction of propagation F of the electric arc 5, and coplanar with the plane formed by the front ends 7A of the splitting plates 7.

The rigid strips may advantageously be perforated with a plurality of ports in order to provide air flow between the divergent space 9 and the breaker device 6.

Preferentially, the rigid strips will, through one of their faces, contact the front ends 7A of the splitting plates 7, and will preferentially be sealably supported upon the splitting plates.

In a still more preferential way, the insulating means 10 are formed by caps 13 positioned on either side of the groove 12 and designed so that, in their functional position, they cover the front end 7A of one or more splitting plates 7.

As is illustrated in FIGS. 3 and 4, the caps 13 are preferentially formed by a substantially elongated strip 14, intended to cover the front end 7A with several splitting plates 7, and from which an edge 15 is extended, laid out and oriented so that when the cap 13 is in its functional position, the edge 15 will naturally cover the upper edge 12A of the groove 12.

Preferentially, the edge 15 of the cap 13 is adapted in order to substantially penetrate inside the groove 12 when the cap 13 is in its functional position (FIG. 3).

In a still more preferential way, and as is illustrated in FIG. 3, the cap 13 has a substantially U-shaped section so as to cover the end of the branches 7C, 7D of the splitting plates 7, thereby substantially conforming to the shape of the branches 7C, 7D.

Figure 2:
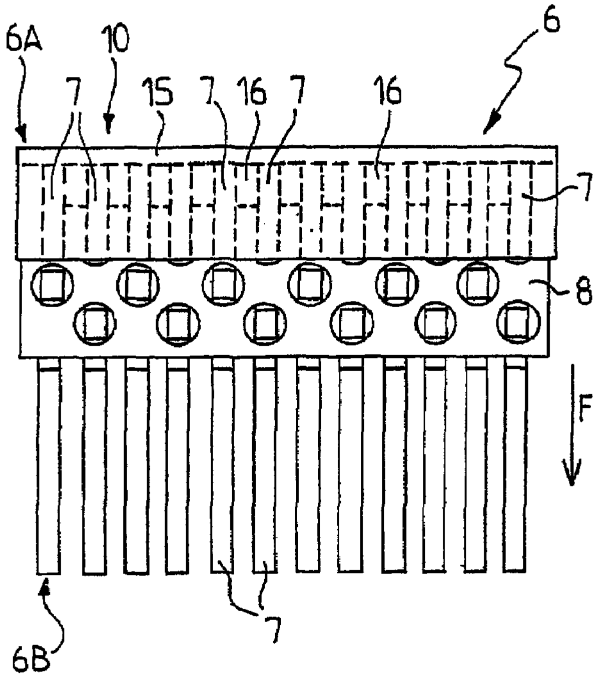
FIG. 2 is a side view of a first exemplary embodiment of a breaker device for the protection device according to the present invention.

According to an exemplary embodiment illustrated in FIG. 2, the caps 15 include teeth 16 positioned at a distance from each other, preferably at regular intervals, and adapted in order to be housed between two consecutive splitting plates 7 when the cap 13 is in its functional position. With the teeth 16, it is thereby possible to prevent the splitting plates 7 at their front ends 7A from deforming and notably moving closer to each other, while improving the insulation properties of the caps 13.

According to an exemplary embodiment of the present invention (not shown in the figures), the insulating means 10 are advantageously made of the same material as the casing 20 of the protection device 1, the casing 20 including the main electrodes 2, 3 on the one hand, and the breaker device 6 on the other hand.

In this case, the shape of the inner surface of the casing 20 is adapted, for example, upon manufacturing the casing 20 by moulding, in order to exhibit relief structures capable of forming the insulating means 10.

The insulating means 10 and/or the casing 20 may advantageously be made from a rigid material capable of withstanding the temperature of the arc, for example, injected plastic with good temperature resistance, and even more preferentially epoxy resin or ceramic.

According to another exemplary embodiment of the present invention, illustrated in FIG. 5, the insulating means 10 are advantageously formed by one or several preferably flexible and adhesive strips 17. The strips 17 are advantageously laid out so as to cover in totality the upstream end 6A of the breaker device 6 located around the entry area E for the arc. As is illustrated in FIG. 5, the strips 17 are located on either side of the groove 12 so as to advantageously cover the front ends 7A of the splitting plates 7, notably of the branches 7C, 7D, thereby forming caps 13 with an edge 15, substantially penetrating inside the grove 12, similar to the exemplary embodiments described earlier.

Advantageously, the strips 17 are made in a temperature-resistant insulating material and are notably resistant to the temperature of the arc. Preferentially, the strips 17 are made from a glass fabric coated on one of its faces with an adhesive of the thermosetting silicone type, so as to provide excellent thermal and mechanical strength.

The strips 17 preferably include a sticky portion allowing the strip(s) 17 to be attached onto the upstream end 6A of the breaker device 6, by adhesion.

In a particularly advantageous way, the sticky portion of the strips 17 will thus intimately conform to the upstream end 6A of the breaker device 6.

Figure 6:
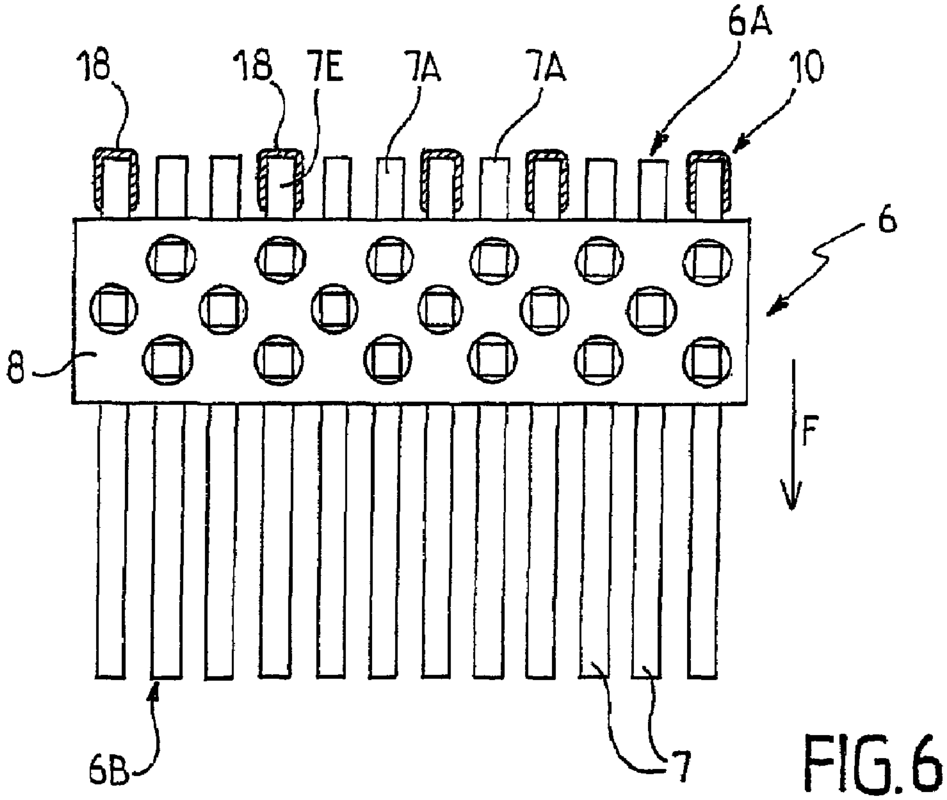
FIG. 6 is a side view of another exemplary embodiment of a breaker device for the protection device according to the present invention.
Figure 7:
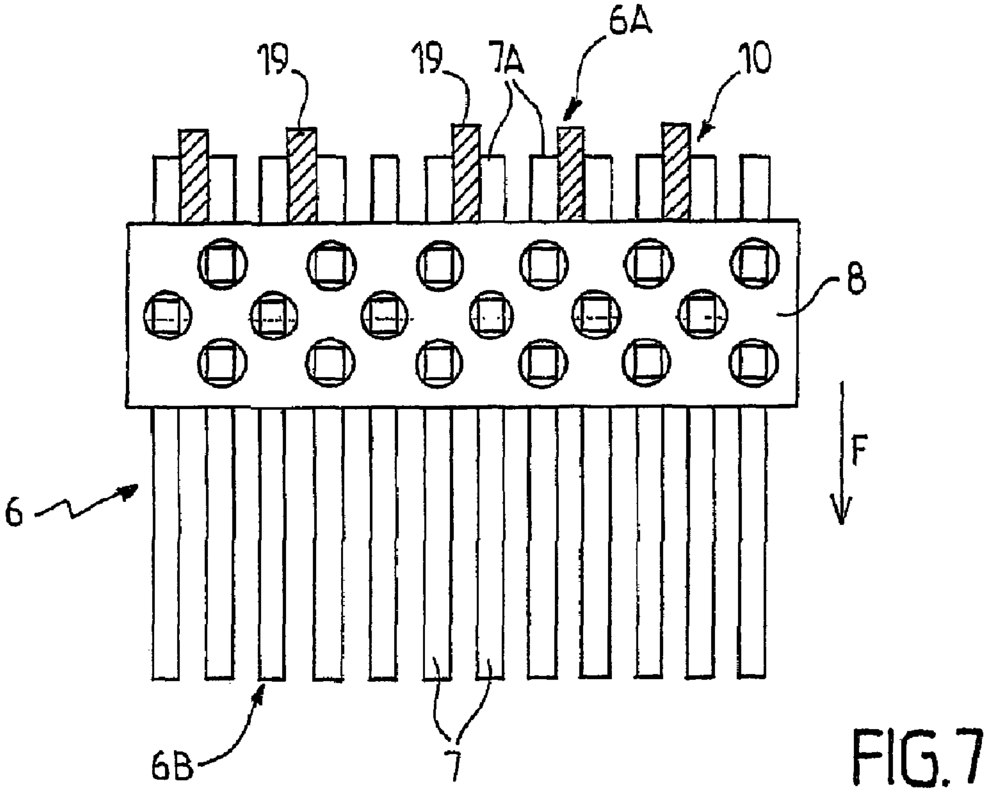
FIG. 7 is a side view of another exemplary embodiment of a breaker device for the protection device according to the present invention.

According to another exemplary embodiment of the present invention illustrated in FIGS. 6 and 7, the insulating means 10 do not form a physical barrier between the electrodes 2, 3, and the upstream end 6A of the breaker device 6, but an immaterial electrically insulating barrier.

According to another exemplary embodiment illustrated in FIG. 6, the insulating means 10 are advantageously formed by an electrically insulating coating 18 deposited on substantially the whole surface of the terminal portion 7E, located towards the front end 7A, of one or several splitting plates 7. The coating 18 is advantageously positioned so as cover the terminal portion 7E. With the coating 18, it is possible to significantly increase the distance over which the electric arc should travel to form again outside the breaker device 6. The presence of the coating 18, therefore, has the effect of reducing the likelihood that the electric arc does not form again between the main electrodes 2, 3, outside the breaker device 6.

According to another exemplary embodiment of the present invention illustrated in FIG. 7, the insulating means 10 are formed by insulating plates 19 located on either side of the groove 12 and interposed between two successive splitting plates 7 so as to extend towards the outside of the breaker device 6, beyond the front end 7A of the splitting plates 7.

With the insulating plates 19, it is also possible to prevent the electric arc from escaping outside the breaker device 6 by increasing the distance over which the electric arc has to travel, to form again outside the breaker device 6, between the main electrodes 2, 3.

According an even more preferential exemplary embodiment of the present invention, the breaker device 6 includes, at its downstream end 6B, an insulating screen 30 positioned so as to at least partly cover the downstream end 6B of the breaker device 6, so as to prevent the electric arc 5 from escaping from the breaker device 6 after the electric arc has crossed the breaker device, for example once (FIG. 1).

In this preferential exemplary embodiment, the insulating means 10 have a crucial role in that after having crossed the breaker device 6 along the direction of propagation F, the electric arc 5 will "rebound" on the insulating screen 30, and again leave in a direction substantially opposite to the direction of propagation F, towards the upstream end 6A of the breaker device 6. In such a configuration, the applicant noticed that the electric arc 5 preferentially moved up along the branches 7C, 7D of the splitting plates 7 and much more infrequently at the central portion 12B of the groove 12.

In this preferential exemplary embodiment, the insulating barrier formed by the insulating means 10, provides a notable reduction in the likelihood that the electric arc can escape at the upstream end 6A of the breaker device 6, thereby preventing the electric arc 5 from forming again between the main electrodes 2, 3.

The operation of the protection device 1 according to the present invention will now be described with reference to FIGS. 1-7.

During operation, when an overvoltage exceeding a predetermined threshold value occurs, notably as a result of a lightning impact, an electric arc 5 is established between both main electrodes 2, 3, which allows the lightning current to flow to ground. This electric arc 5 then moves up to the breaker device 6 into which the electric arc penetrates at the entry area E, substantially located in the same plane as the groove 12. The electric arc 5 is then broken down into a plurality of elementary arcs in order to increase the arc voltage of the current relatively to the mains voltage and to limit the intensity of the currents drained by the protection device. The elementary electric arcs move towards the downstream end 6B of the breaker device 6 until they encounter the insulating screen 30. A "rebound" phenomenon then occurs, and the elementary electric arcs again leave in the direction opposite to the initial direction of propagation F of the electric arc 5, towards the upstream end 6A of the breaker device 6. According to the most likely operating mode, the elementary electric arcs move towards the branches 7C, 7D and more specifically along the latter up to their front end 7A. They are then trapped by the insulating means 10, which prevent the electric arc 5 from forming again outside the breaker device 6.

The protection device 1 according to the invention, therefore, has an improved current-breaking power for breaking the short-circuit current or the follow current, as compared with the devices of the prior art, and this by limiting the likelihood that the electric arc, once located inside the breaker device and broken down into a plurality of elementary arcs, escapes from the breaker device in order to form again outside the latter between the main electrodes.

By the presence of the insulating means 10, the protection device according to the present invention has a current-breaking power multiplied by at least two as compared with devices from the prior art.

The invention finds one aspect of its industrial application in the design, the manufacturing and the use of protection devices against overvoltages, overloads, or short-circuits.

The invention claimed is:

1. A protection device for protecting an electrical installation against overvoltages, overloads or short-circuits, comprising:

at least two main electrodes between which an electric arc is able to form, and an electric arc breaker device extending, considering the direction of propagation of the electric arc, between an upstream end and a downstream end and having, at the upstream end an entry area for the arc, at which the electric arc penetrates inside the breaker device, wherein the breaker device including, positioned at the upstream end, insulating means against the return of the electric arc, structurally designed and laid out to allow the electric arc to enter the breaker device while forming an obstacle against the exiting of the electric arc, to prevent the electric arc, once located inside the breaker device from escaping from the breaker device, the insulating means are formed by several flexible strips in an insulating material, laid out in order to form a partial insulating barrier between the electrodes and the upstream end, wherein the strips are laid out to cover in totality the upstream end of the breaker device located around the entry area for the arc.

2. The device of claim 1, wherein the breaker device is formed by an assembly of splitting plates extending, considering the direction of propagation of the electric arc, between a front end and a distal end, the splitting plates having a notch to form, once assembled, a groove laid out to attract the electric arc so that the entry area for the arc substantially coincides with the groove.

3. The device of claim 2, wherein the strips are positioned on either side of the groove to cover the front ends of the splitting plates.

4. The device of claim 3, wherein the strips form caps with an edge substantially penetrating inside the groove.

5. The device of claim 1, wherein the strips include a sticky portion allowing the strips to be attached onto the upstream end by adhesion.

6. The device of claim 1, wherein the strips are formed by a glass fabric coated on one face with an adhesive.

7. The device of claim 6, wherein the adhesive is formed by a thermosetting silicone.

8. The device of claim 1, wherein the breaker device includes, at the downstream end, an insulating screen positioned to cover at least partly the downstream end of the breaker device in order to prevent the electric arc from escaping from the breaker device after the electric arc has crossed the break device.

9. The device of claim 1, wherein the breaker device is formed by an assembly of splitting plates extending, considering the direction of propagation of the electric arc, between a front end and a distal end, the splitting plates having a notch to form, once assembled, a groove laid out to attract the electric arc so that the entry area for the arc substantially coincides with the groove.

* * * * *